United States Patent
Al-Rawi et al.

(10) Patent No.: US 11,144,085 B2
(45) Date of Patent: Oct. 12, 2021

(54) DYNAMIC MAXIMUM FREQUENCY LIMIT FOR PROCESSING CORE GROUPS

(71) Applicant: Intel Corporation, Santa Clara, CA (US)

(72) Inventors: Asma H. Al-Rawi, Hillsboro, OR (US); Federico Ardanaz, Hillsboro, OR (US); Jonathan M. Eastep, Portland, OR (US); Dorit Shapira, Atlit (IL); Krishnakanth Sistla, Beaverton, OR (US); Nikhil Gupta, Hillsboro, OR (US); Vasudevan Srinivasan, Hillsboro, OR (US); Chris MacNamara, Co. Limerick (IE)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 15/632,000

(22) Filed: Jun. 23, 2017

(65) Prior Publication Data

US 2018/0373287 A1    Dec. 27, 2018

(51) Int. Cl.
| | | |
|---|---|---|
| G06F 1/06 | (2006.01) | |
| G06F 1/04 | (2006.01) | |
| G06F 1/08 | (2006.01) | |
| G06F 9/50 | (2006.01) | |
| G06F 1/324 | (2019.01) | |
| G06F 9/48 | (2006.01) | |

(52) U.S. Cl.
CPC ............ *G06F 1/06* (2013.01); *G06F 1/04* (2013.01); *G06F 1/08* (2013.01); *G06F 1/324* (2013.01); *G06F 9/505* (2013.01); *G06F 9/5044* (2013.01); *G06F 9/5094* (2013.01); *G06F 9/4812* (2013.01); *G06F 2209/504* (2013.01); *G06F 2209/5022* (2013.01)

(58) Field of Classification Search
None
See application file for complete search history.

(56) References Cited

U.S. PATENT DOCUMENTS

| | | | |
|---|---|---|---|
| 8,671,179 B2 * | 3/2014 | Altaf | H04L 67/1031 709/224 |
| 8,793,686 B2 * | 7/2014 | Aasheim | G06F 9/45558 718/1 |
| 9,519,305 B2 | 12/2016 | Wolfe et al. | |

(Continued)

OTHER PUBLICATIONS

International Search Report and Written Opinion from PCT/US2018/034568 dated Sep. 5, 2018, 15 pgs.

(Continued)

*Primary Examiner* — Elias Mamo
(74) *Attorney, Agent, or Firm* — Schwabe, Williamson & Wyatt, P.C.

(57) ABSTRACT

An apparatus system is provided which comprises: a first component and a second component; a first circuitry to assign the first component to a first group of components, and to assign the second component to a second group of components; and a second circuitry to assign a first maximum frequency limit to the first group of components, and to assign a second maximum frequency limit to the second group of components, wherein the first component and the second component are to respectively operate in accordance with the first maximum frequency limit and the second maximum frequency limit.

26 Claims, 5 Drawing Sheets

(56) References Cited

U.S. PATENT DOCUMENTS

| | | | |
|---|---|---|---|
| 9,619,009 B2 | 4/2017 | Rotem et al. | |
| 2005/0046400 A1* | 3/2005 | Rotem | G06F 1/3203 |
| | | | 323/234 |
| 2008/0215805 A1* | 9/2008 | Rombach | G11C 7/1057 |
| | | | 711/110 |
| 2009/0172375 A1* | 7/2009 | Rotem | G06F 1/206 |
| | | | 713/1 |
| 2009/0235108 A1* | 9/2009 | Gold | G06F 1/206 |
| | | | 713/500 |
| 2009/0271141 A1* | 10/2009 | Coskun | G06F 1/206 |
| | | | 702/132 |
| 2009/0271646 A1* | 10/2009 | Talwar | G06F 1/3203 |
| | | | 713/322 |
| 2014/0173311 A1* | 6/2014 | Park | G06F 1/3206 |
| | | | 713/320 |
| 2014/0195829 A1 | 7/2014 | Bhandaru et al. | |
| 2015/0006915 A1* | 1/2015 | Ganesan | G06F 1/26 |
| | | | 713/300 |
| 2016/0103474 A1 | 4/2016 | Kumar et al. | |
| 2017/0031427 A1 | 2/2017 | Allen-Ware et al. | |
| 2018/0129534 A1* | 5/2018 | Iyigun | G06F 9/4881 |

OTHER PUBLICATIONS

International Preliminary Report on Patentability from PCT/US2018/034568 dated Jan. 2, 2020, 11 pgs.

\* cited by examiner

DYNAMIC MAXIMUM FREQUENCY LIMIT FOR PROCESSING CORE GROUPS

BACKGROUND

Modern computing devices may include multiple processing cores, e.g., tens, hundreds, or even thousands of processing cores. Sharing resources (e.g., current, power, thermal contribution, etc.) among multiple processing cores may be a non-trivial task.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
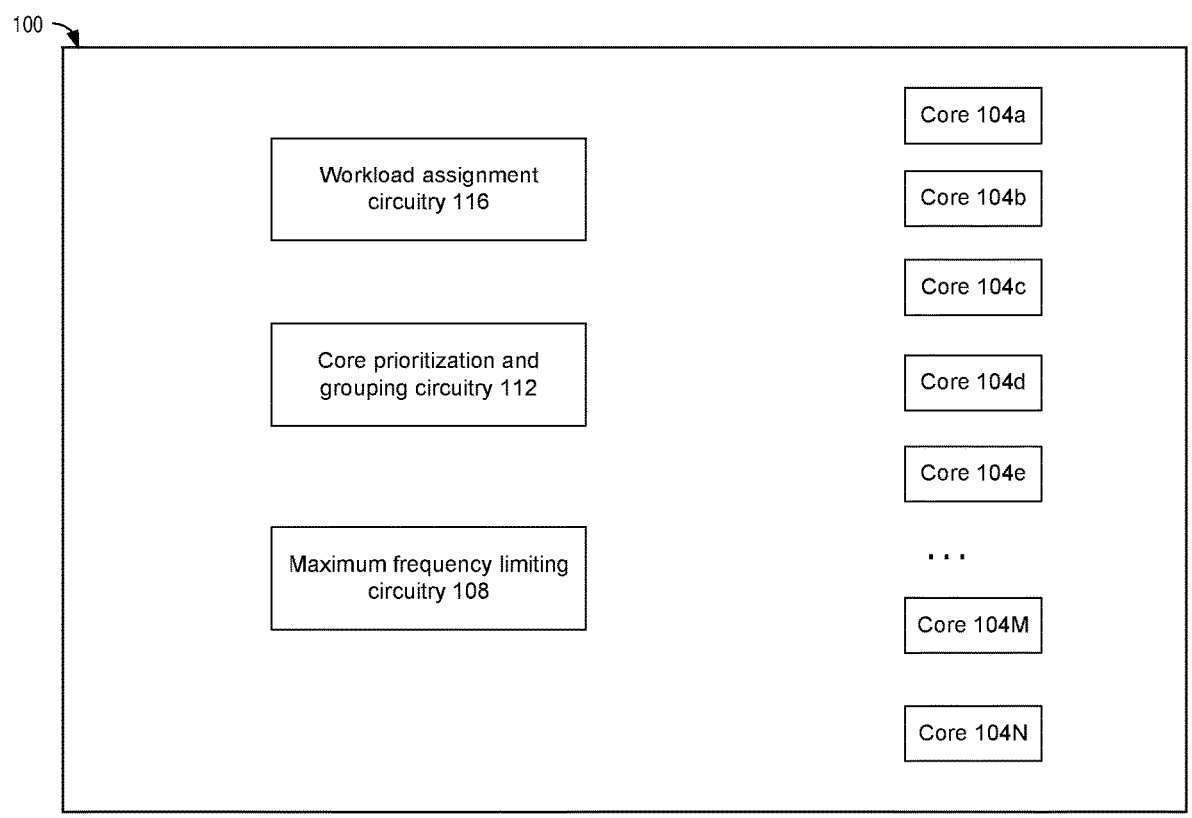
FIG. 1 schematically illustrates a computing device comprising a plurality of processing cores and a maximum frequency limiting circuitry, where the maximum frequency limiting circuitry may adaptively and dynamically configure maximum frequency limits of individual processing cores of the computing device, according to some embodiments.

In a multi-core system, a maximum frequency limit (also referred to as a maximum operating frequency, or a turbo frequency) for all the processing cores may be same. Thus, in a multi-core system, irrespective of workload distribution or criticality of workload assignment, each processing core may have the same maximum frequency limit. Because all the processing cores are assigned the same maximum frequency limit, the maximum frequency limit may be relatively low. The maximum frequency limit in such a multi-core system may also be referred to as a baseline maximum frequency limit.

In some embodiments and as discussed in this disclosure, in a multi-core system, assignment of maximum frequency limit or turbo frequencies may be based on, among other factors, workload assignment to various cores, frequency requested by various cores, etc. For example, a first processing core may be assigned relatively high critical task (or high computational intensive task, or computational task that may tolerate low latency), and the first processing core may be assigned a relatively higher maximum frequency limit. On the other hand, a second processing core may be assigned relatively low critical task (or low computational intensive task, or computational task that may tolerate high latency), and the second processing core may be assigned a relatively lower maximum frequency limit. Put differently, maximum frequency limits may be dynamically and adaptively assigned to various processing cores. Accordingly, some critical processing cores may have maximum frequency limits that may be higher than the above discussed baseline maximum frequency limit, although some non-critical processing cores may have maximum frequency limits that may be lower than the baseline maximum frequency limit. Thus, critical, computationally intensive and/or time sensitive workload may be completed at a faster rate by the processing cores having the higher maximum frequency limits. This may result in improvement of performance for the overall system. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back,", "top," "bottom," "over," "under," and the like in the description and in the claims, if any, are used for descriptive purposes and not necessarily for describing permanent relative positions.

FIG. 1 schematically illustrates a computing device 100 (henceforth also referred to as device 100) comprising a plurality of processing cores 104a, 104b, 104M, 104N and a maximum frequency limiting circuitry 108 (henceforth also referred to as circuitry 108), where the circuitry 108 may adaptively and dynamically configure maximum frequency limits of individual processing cores 104 of the device 100, according to some embodiments.

Elements referred to herein with a common reference label followed by a particular number or alphabet may be collectively referred to by the reference label alone. For example, processing cores 104a, 104b, . . . , 104M, 104N may be collectively and generally referred to as processing cores 104 in plural, and processing core 104 in singular. Processing core 104 may also be referred to as core 104. Although FIG. 1 illustrates the device comprising "N" number of cores, such a number is merely an example, and the device 100 may comprise ones, tens, hundreds, or even thousands of cores.

The device 100 may be any appropriate computing device that may be used for any appropriate operation. Merely as example, the device 100 may be used in high performance computing (HPC) applications, cloud computing applications, applications associated with communications, networking, data centers, laptop, desktop, mobile computing device, communications infrastructure, smart phone, tablet, and/or the like. For example, the device 100 may be any device that may operate as a multi-core processing device.

Figure 2:
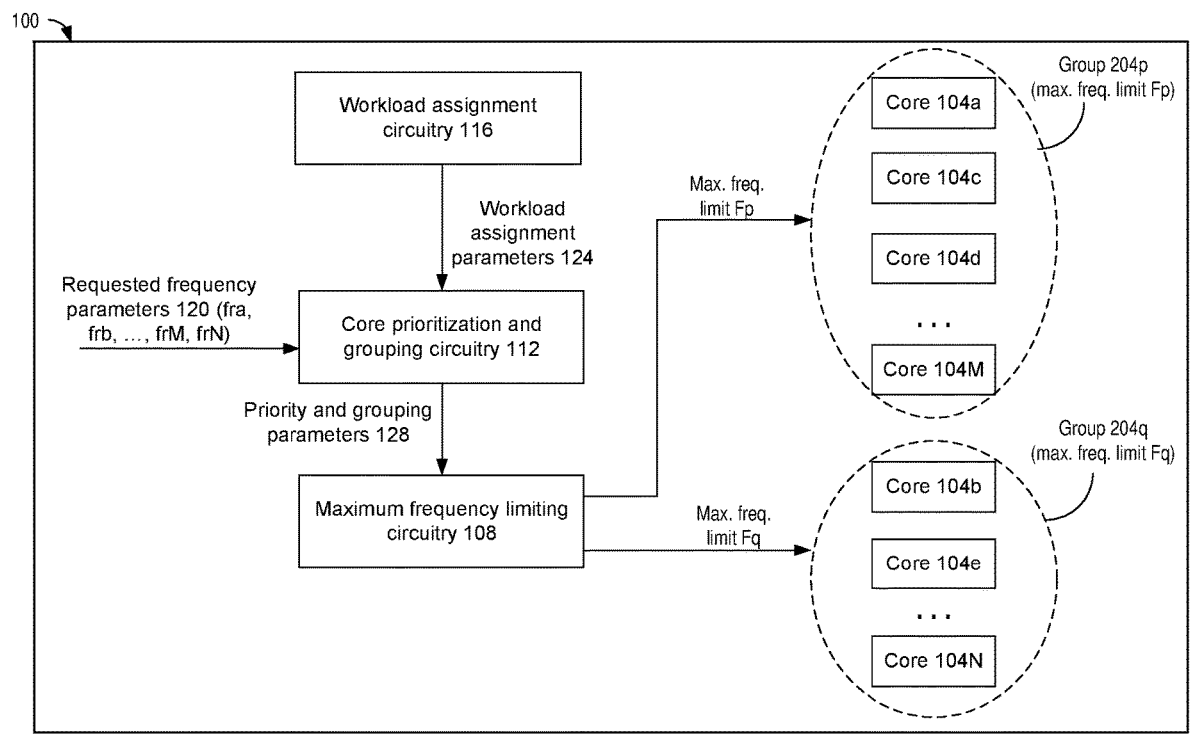
FIG. 2 schematically illustrates functionality of the computing device of FIG. 1, according to some embodiments.

In some embodiments, the device 100 may comprise a core prioritization and grouping circuitry 112 (also referred to as circuitry 112), and a workload assignment circuitry 116 (also referred to as circuitry 116), which are discussed in further details with respect to FIG. 2.

Although FIG. 1 illustrate circuitries 108, 112, and 116 to be distinct and separate, in some embodiments, one or more of these circuitries may be at least in part combined. Although the device 100 may include numerous other components (e.g., memory, communication interface, input/output interface, display, etc.), such components are not illustrated in FIG. 1 so as to not obfuscate the teachings of this disclosure.

FIG. 2 schematically illustrates functionality of the computing device 100 of FIG. 1, according to some embodiments. In some embodiments, the circuitry 116 may be configured to assign workloads to the cores 104. For example, the circuitry 116 may allocate threads to different cores 104. In some embodiments, the circuitry 116 may operate as a load balancing circuitry, e.g., to balance workload among the different cores 104. In some embodiments, the circuitry 116 may operate to schedule or distribute workload, e.g., perform workload distribution or assignment. The workload assignment may be based on availability of cores 104 for workload assignment, priority of the workload, state of individual cores (e.g., whether active, or in a low power state), and/or one or more other factors generally associated with workload assignment or load balancing in a multi-core processing environment. In some embodiments, the circuitry 116 may also determine or estimate a frequency (or a range of frequency) to be used for completing a workload, a criticality of the workload, a priority associated with the workload, a latency tolerance associated with the workload (e.g., whether the workload may tolerate high latency or low latency), a time-sensitiveness of the workload (e.g., whether the workload can be executed with some delay, or has to be executed with minimum or no delay), and/or one or more other parameters associated with the workload. In some embodiments, at least a part of the circuitry 116 may be implemented in a processing core (e.g., which may be one of the cores 104, or different from the core 104). In some embodiments, an operating system may facilitate in the workload assignment.

In some embodiments, based on assigning the workload among one or more of the cores 104, the circuitry 116 may generate workload assignment parameters 124 (henceforth also referred to as "parameters 124"). The parameters 124 may, for example, represent one or more of a quantum of workload assigned to individual cores 104, a criticality or time sensitivity of workload assigned to individual cores 104, a priority associated with the workload, a quality of service (QoS) associated with workload assigned to individual cores 104, a time required to complete the workload assigned to individual cores 104, a latency that the workload may tolerate, a power, current, time and/or frequency required by individual cores 104 to complete the workload assigned to individual cores 104, etc. Put differently, the parameters 124 may be any appropriate parameters that somehow characterize the workload assigned to various cores 104. In some embodiments, the circuitry 116 may transmit the parameters 124 to the circuitry 112.

In some embodiments, to complete the assigned workload, a core 104 may prefer to operate at a specific frequency (or a specific frequency range). For example, the core 104a may request a frequency fra to complete the workload assigned to the core 104a, the core 104b may request a frequency frb to complete the workload assigned to the core 104b, and so on. The requested frequency fra may merely be an indication of a frequency requested by the corresponding core 104a. The actual operating frequency of the core 104a, however, may be different from the requested frequency fra.

In some embodiments, the circuitry 112 may receive the requested frequencies fra, . . . , frN (also referred to as requested frequency parameters 120, or simply as parameters 120) respectively corresponding to the cores 104a, . . . , 104N, and may also receive the parameters 124. In some embodiments, the circuitry 112 may group the cores 104 in two or more groups. FIG. 2 illustrates the circuitry 112 grouping the cores 104 in two groups 204p and 204q (illustrated using dotted lines), but in some other embodiments, the circuitry 112 may group the cores 104 in more than two groups.

In the example of FIG. 2, the cores 104a, 104c, 104d, 104M, etc. are allocated to a first group 204p, and the cores 104b, 104e, 104N, etc. are allocated to a second group 204q. In some embodiments, the grouping of the cores 104 may be based on the parameters 124, the requested frequencies fr, and/or the like.

Merely for the sake of discussion purposes, the first group 204p may be referred to as a high priority group, and the second group 204q may be referred to as a low priority group. In an example, as the number of groups grow larger, adjectives such as very high priority, high priority, medium priority, low priority, very low priority, etc. may be used. In other examples, the groups may simply be referred to using numeric labels, e.g., first, second, third, etc.

In an example, the circuitry 108 may group a core 104, which may be assigned a relatively high priority workload, to the group 204p. Examples of high priority assigned workload may include workload that may be time sensitive, that may be associated with a higher QoS, that may be a critical component potentially holding a pipeline, and/or the like. In some embodiments, the parameters 124 may provide an indication of a priority level of workload assigned to a core.

In another example, the circuitry 108 may group a core 104, which may be estimated to take a relatively longer duration of time to complete assigned workload, to the group 204p.

In yet another example, the circuitry 108 may assign a core 104, which may request a higher frequency to complete assigned workload, to the group 204p. For example, the circuitry 112 may take into account the requested frequency parameters 120 while grouping the cores 104.

As an example, if a requested frequency of a core (e.g., requested frequency fra of the core 104a) is higher than a cutoff frequency fc, the core may be assigned to the group 204p; and if the requested frequency of the core is lower than the cutoff frequency fc, the core may be assigned to the group 204q.

In another example, the circuitry 108 may group the cores 104 based on estimated power, current, frequency, and/or voltage requirements to complete the assigned workload. For example, cores 104 that may be estimated to utilize higher power or higher current to tend to the assigned workload may be grouped in the group 204p.

In some embodiments, the circuitry 112 may include the grouping information in priority and grouping parameters 128. For example, the parameters 128 may identify the group to which a specific core is assigned. In some embodiments, the circuitry 112 may transmit the parameters 128 to the circuitry 108. For example, the circuitry 112 may store the parameters 128 is a table, from where the circuitry 108 may access the parameters 128.

In some embodiments, the circuitry 108 may assign a maximum frequency limit of a core 104, based on a group to which the core 104 is assigned. For example, cores 104a, 104c, 104d, and 104M of the group 204p may be assigned a maximum frequency limit Fp, and cores 104b, 104e, and 104N of the group 204q may be assigned a maximum frequency limit Fq. In some embodiments, the maximum frequency limit Fp may be higher than the maximum frequency limit Fq (e.g., based on the group 204p having a higher priority than the group 204q).

In some embodiments, the maximum frequency limit assigned to a core 104 (e.g., core 104a) may be a maximum operating frequency or a turbo frequency of the core 104a. For example, the core 104a may operate at a turbo boost mode of operation for short and intermittent time periods, and the core 104a may operate at the maximum operating frequency Fp during such short intermittent time periods. Put differently, the frequency of operation of the core 104a may be limited by the maximum operating frequency Fp, which may form a frequency ceiling for the core 104a. The core 104a can, for example, operate at frequencies lower than or equal to the maximum operating frequency Fp. In some examples, the maximum operating frequency Fp may also be referred to as the turbo frequency for the cores of the first group 204p. In an example, the maximum frequency limit or the turbo frequency may be a maximum frequency (e.g., achievable on a chip), which may be a higher frequency than a guaranteed maximum frequency. As discussed herein, various embodiments of this disclosure may allow a processor to achieve frequencies above the all-core turbo, e.g., may increase the maximum frequency achievable.

Merely as an example, the core 104a may be assigned the maximum operating frequency Fp. Also, the core 104a may have a requested frequency of fra. Accordingly, in some embodiments, the core 104a may operate at a minimum of the maximum operating frequency Fp and the requested frequency fra. The requested frequency fra may, for example, change with a change in the workload of the core 104a, or may change due to a number of factors (e.g., thermal consideration, limited power available for the core 104a, etc.)—but the maximum operating frequency of the core 104a may be limited by the frequency Fp.

In some embodiments, the circuitry 108 may write the maximum operating frequencies Fp and Fq to respective registers. A frequency control circuit or a frequency governor (not illustrated in the figures), e.g., which may control a frequency of the core 104a, can access the maximum operating frequency Fp from the corresponding register. In an example, the frequency control circuit or the frequency governor (or the core 104a) may control a phase locked loop (PLL) or another appropriate clock generator (not illustrated in the figures), e.g., such that the maximum operating frequency Fp forms a frequency ceiling for the core 104a.

In some embodiments, the circuitries 112 and/or 108 may comprise appropriate hardware components. For example, the circuitries 112 and/or 108 may be implemented as microprocessor(s), dedicated hardware components and circuitries, etc.

Figure 3:
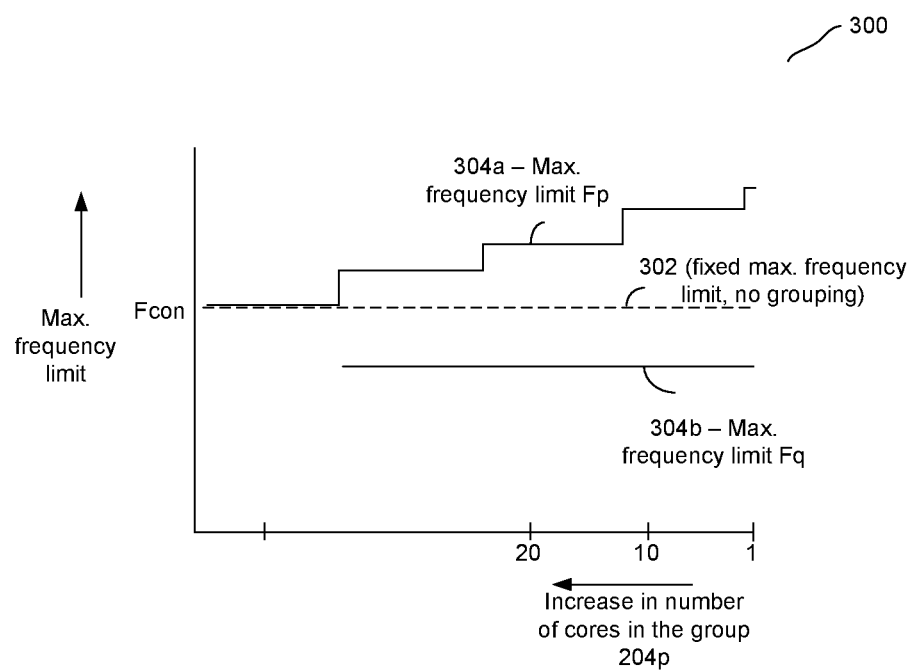
FIG. 3 illustrates a graph depicting dynamic maximum frequency limits for multiple processing cores of a computing device, according to some embodiments.

FIG. 3 illustrates a graph 300 depicting dynamic maximum frequency limits for multiple cores 104 of the device 100, according to some embodiments. In the graph 300, the Y axis represents a maximum frequency limit for various cores 104, and the X axis represents a number of cores 104 in the high priority group 204p. For example, as one traverses from right to left along the X axis, the number of cores in the group 204p increases, as illustrated by an arrow in the figure.

A dotted line 302 represents a maximum frequency limit for the device 100, e.g., if the device 100 is to operate conventionally. For example, if the device 100 is to be operated conventionally (e.g., without grouping the cores 104 and without having different maximum frequency limits for different cores), all the cores 104 would have a fixed and same maximum frequency limit Fcon, as illustrated by the line 302. The maximum frequency limit Fcon may also be referred to as a baseline or conventional maximum frequency limit.

In some embodiments and as discussed with respect to FIG. 2, some of the cores 104 (e.g., cores 104a, 104c, 104d, 104M, etc.) may operate at the maximum frequency limit Fp, while some of the cores 104 (e.g., cores 104b, 104e, 104N, etc.) may operate at the maximum frequency limit Fq. A line 304a in FIG. 3 illustrates the maximum frequency limit Fp for the group 204p, and the line 304b illustrates the maximum frequency limit Fq for the group 204q.

In some embodiments, the maximum frequency limit Fq may be lower than the conventional maximum frequency limit Fcon. However, in some embodiments, the maximum frequency limit Fp may be higher than the conventional maximum frequency limit Fcon.

In some embodiments, the maximum frequency limit Fp may be a function of the number of cores in the group 204p. For example, if a lower number of cores are in the group 204p, the maximum frequency limit Fp may be relatively higher. As the number of cores in the group 204p becomes higher and approaches the total number of cores 104 (e.g., if all the cores 104 are in the group 204p), the maximum frequency limit Fp may approach the conventional maximum frequency limit Fcon.

Thus, for example, if some selective cores 104 (e.g., cores 104a, 104c, 104d, 104M, etc.) are grouped in the group 204p, these cores can have the maximum frequency limit Fp that may be higher than if all the cores 104 are operated at the conventional maximum frequency limit Fcon. By grouping the cores 104 in two or more groups and by allocating different maximum frequency limits to different groups, critical or high priority cores can be assigned higher maximum frequency limit Fp, whereas non-critical cores can be assigned a relatively lower maximum frequency limit Fq. Also, the non-critical cores may not even need to exceed the maximum frequency limit Fq (e.g., as these cores may perform relatively light and non-critical workload), and hence, by limiting these cores to a lower maximum frequency limit Fq may not result in substantial or significant performance degradation for the non-critical cores. However, the higher maximum frequency limit Fp of the critical cores can provide a significant performance boost in the critical cores. This may result in performance enhancements in the overall device 100. Although non-critical cores may have some degradation of performance, the critical cores may have significant boost in performance, which may lead to faster overall performance of the device 100 and/or overall reduction in power consumption of the device 100.

In some embodiments, because an increase in the maximum frequency limit for some cores are compensated by a corresponding decrease in the maximum frequency limit for some other cores, overall power limit, current limit, thermal limit, reliability limit, etc. of the device 100 may be maintained. Thus, the maximum frequency limit for the critical cores may be increased (e.g., beyond the conventional maximum frequency limit Fcon), without violating any system thermal, current, voltage, reliability, or power boundaries.

Referring again to FIG. 2, the circuitries 112 and/or 108 may group the cores 104 and assign the frequencies Fp and Fq, based on a variety of factors (e.g., some of which have been discussed herein previously). For example, existing reliability limit, power limit, thermal limit, current limit, etc. may be taken into account, e.g., while determining the additional range of frequencies achievable by the critical cores.

In some embodiments, additional factors may also be taken into account when grouping the cores 104 in the groups, and/or when determining the maximum frequency limits Fp and Fq. For example, a number of cores allowed to exceed the existing conventional maximum frequency attainable (e.g., maximum frequency limit Fcon of FIG. 2), e.g., the number of cores in the group 204p, may be taken into account by the circuitry 108 to calculate the maximum frequency limit Fp. In some embodiments, the circuitries 108 and/or 112 may also take into account the maximum frequency limit above the baseline, e.g., to which these critical cores may be set. In some embodiments, the circuitries 108 and/or 112 may also take into account the maximum frequency limit of the non-critical cores that may not be allowed to exceed the conventional maximum frequency limit. In some embodiments, power metrics, maximum current metrics, reliability metrics, thermal metrics, etc. may be taken into account by the circuitry 112 and/or the circuitry 108 while grouping the cores 104 and/or while setting the frequencies Fp and Fq.

As discussed herein above with respect to FIG. 2, the cores 104 may be grouped in more than two groups. A higher number of groups may increase a granularity with which the maximum frequency limit may be distributed among the groups. As an extreme example, the number of groups may be equal to a number of cores 104 (e.g., individual groups may have one core), such that each core 104 may have a corresponding individual maximum frequency limit.

In some embodiments, the teachings of this disclosure may be applicable to various application areas. For example, in a system that operates multiple virtual machines (VMs), the VMs may be classified in multiple groups. For example, in a simple scenario, the VMs may be grouped in a critical group and a non-critical group. The VMs in the critical group may be assigned a higher maximum frequency limit, and the VMs in the non-critical group may be assigned a lower maximum frequency limit. This, for example, may allow cloud computing providers to offer high priority VMs with higher frequency limits, e.g., as additional VM performance levels. In some embodiments, the teachings of this disclosure may be applicable to other application areas, such as HPC, cloud computing, communications networks, etc.

In some embodiments, the teachings of this disclosure facilitate identifying critical elements and allowing the critical elements to achieve higher turbo or guaranteed frequencies, e.g., without reducing the lifetime of the device and without violating power, thermal, current, and voltage protections. For example, when the cores are not running at the same frequency, the circuitries 116 and/or 112 may learn from the operating frequencies a degree to which the cores are critical versus non-critical. Subsequently, the circuitries 112 and/or 108 may adjust a frequency ceiling for each bin of cores (e.g. critical versus non-critical). The frequency ceilings may be adjusted such that the device may remain within electrical and thermal limits, but the ceiling for critical cores may be raised compared to a conventional system baseline, while trading off the additional headroom with the non-critical cores that get a ceiling lower than the conventional system baseline. The critical cores may exploit the additional headroom and may enable improved performance from the computing device in various scenarios, e.g., HPC, cloud computing, communications networks, etc.

Although various embodiments are discussed with respect to grouping the cores 104 and allocating different maximum frequency limits to different cores, the teachings of this disclosure may not be limited to processing cores only. For example, other components (e.g., memory, graphics processing unit, or any other appropriate components) of the device 100 may also be grouped in multiple groups, and may operate in accordance with different maximum frequency limits, as would be readily understood by those skilled in the art based on the teachings of this disclosure.

Figure 4:
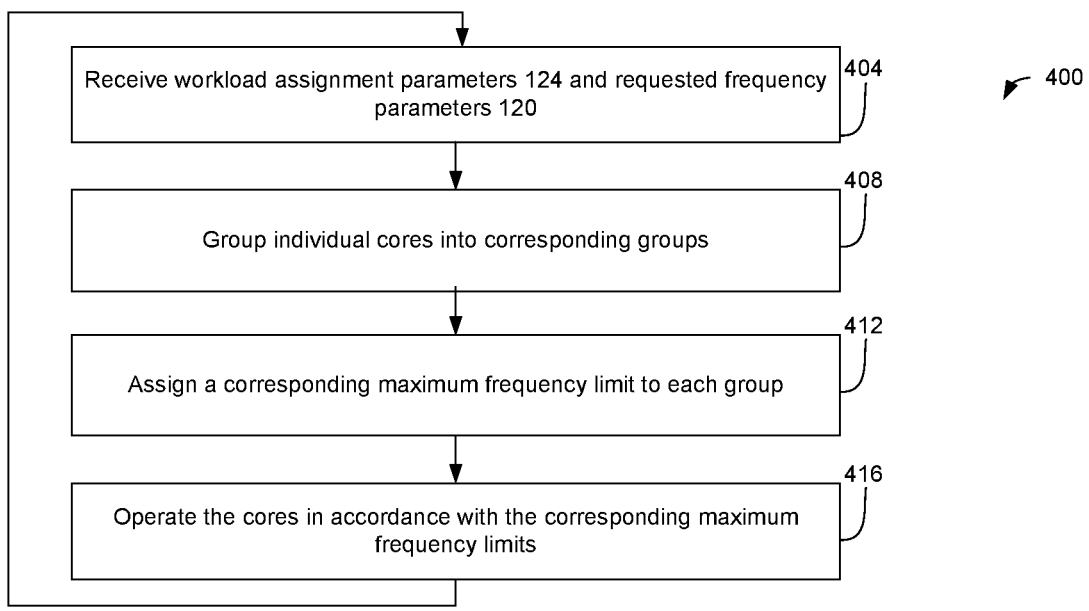
FIG. 4 illustrates a flowchart depicting a method for dynamically setting maximum frequency limits for various processing cores of a computing device, according to some embodiments.

FIG. 4 illustrates a flowchart depicting a method 400 for dynamically setting maximum frequency limits for various cores of a device (e.g., the device 100 of FIG. 1), according to some embodiments. Although the blocks in the flowchart with reference to FIG. 4 are shown in a particular order, the order of the actions can be modified. Thus, the illustrated embodiments can be performed in a different order, and some actions/blocks may be performed in parallel. Some of the blocks and/or operations listed in FIG. 4 may be optional in accordance with certain embodiments. The numbering of the blocks presented is for the sake of clarity and is not intended to prescribe an order of operations in which the various blocks must occur.

In some embodiments, at 404 of the method 400, workload assignment parameters 124 and/or requested frequency parameters 120 may be received (e.g., by circuitry 112). At 408, individual cores may be grouped into corresponding groups of a plurality of groups (e.g., groups 204p, 204q, etc.). Factors used for grouping the cores in various groups have been discussed in details herein previously. As a simple example, a cutoff frequency fc may be determined. If a requested frequency of a core is higher than the cutoff frequency fc, the core may be grouped in a first group (e.g., high priority group 204p); else the core may be grouped in a second group (e.g., low priority group 204q). Other appropriate factors may also be considered while grouping the cores, as discussed in details herein.

At 412, each group may be assigned a corresponding maximum frequency limit (e.g., by the circuitry 108). For example, the groups 204p and 204q may be assigned maximum frequency limits Fp and Fq, respectively. Factors considered for determining the maximum frequency limits for various groups have been discussed in details herein. In some embodiments, a lookup table may store, corresponding to a core (e.g., core 104a), a group (e.g., group 204p) assigned to the core and/or a maximum frequency limit (e.g., maximum frequency limit Fp) assigned to the group comprising the core.

At 416, the cores may be operated in accordance with the corresponding maximum frequency limits. For example, a core may operate at a minimum of a corresponding requested frequency and a corresponding maximum frequency limit.

In some embodiments, the method 400 may dynamically update the grouping of the cores and/or the maximum frequency limits assigned to various groups. Thus, for example, the method 400 may loop back from 416 to 404, and the method 400 may continue.

Figure 5:
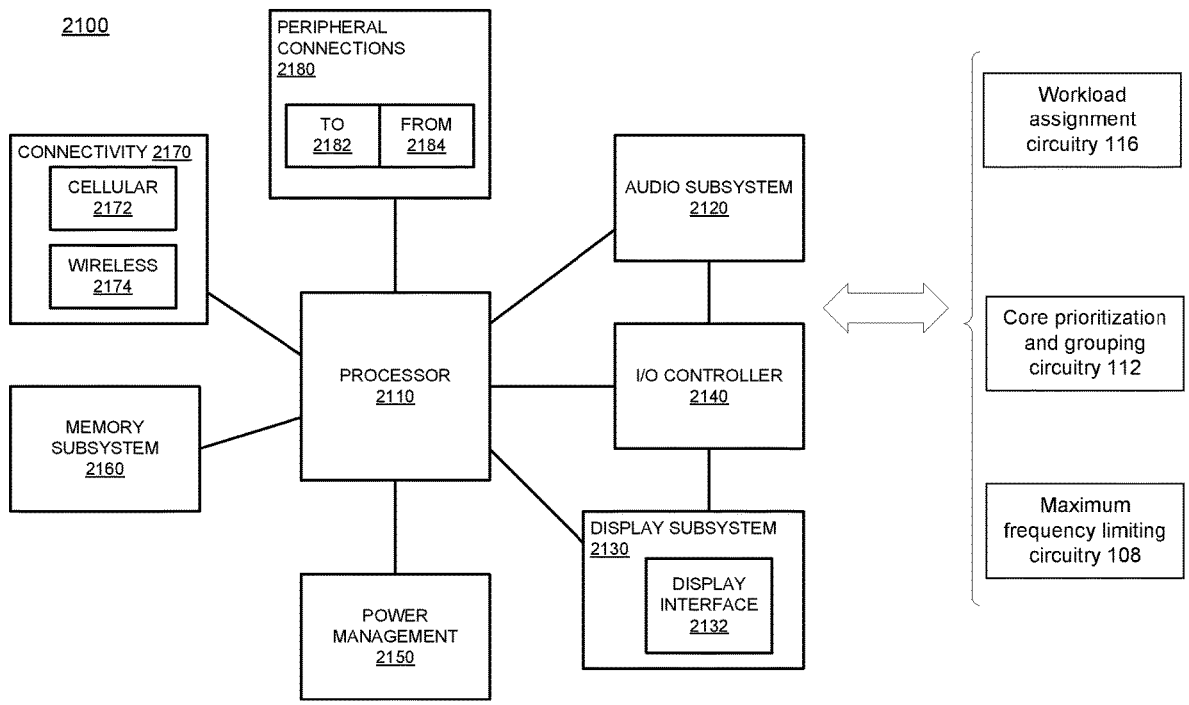
FIG. 5 illustrates a computing device or a SoC (System-on-Chip), where maximum frequency limits may be set dynamically for various processing cores of the computing device, according to some embodiments.

FIG. 5 illustrates a computing device or a SoC (System-on-Chip) 2100, where maximum frequency limits may be set dynamically for various processing cores of the computing device, according to some embodiments. It is pointed out that those elements of FIG. 5 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Although a single processor 2110 is illustrated in FIG. 5, in some embodiments, the computing device 2100 may include multiple processing cores (e.g., as discussed with respect to FIG. 1). In some embodiments, the computing device 2100 may comprise the circuitries 116, 112, and/or 108 of FIG. 1. In some embodiments, the circuitries 116, 112, and/or 108 may dynamically group the processing cores of the computing device 2100, and/or may set the maximum frequency limit of various processing cores based on such groupings, as discussed with respect to FIGS. 1-4.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following example clauses pertain to further embodiments. Specifics in the example clauses may be used anywhere in one or more embodiments. All optional features of the apparatus described herein may also be implemented with respect to a method or process.

Clause 1. An apparatus comprising: a first component and a second component; a first circuitry to assign the first component to a first group of components, and to assign the second component to a second group of components; and a second circuitry to assign a first maximum frequency limit to the first group of components, and to assign a second maximum frequency limit to the second group of components, wherein the first component and the second component are to respectively operate in accordance with the first maximum frequency limit and the second maximum frequency limit.

Clause 2. The apparatus of clause 1, wherein the first component is to operate in accordance with the first maximum frequency limit such that a frequency of operation of the first component does not exceed the first maximum frequency limit.

Clause 3. The apparatus of clause 1, wherein the first component and the second component are a first processing core and a second processing core, respectively.

Clause 4. The apparatus of any of clauses 1-3, wherein the first circuitry is to assign the first component to the first group of components, based at least in part on workload assigned to the first component.

Clause 5. The apparatus of clause 4, wherein the first circuitry is to assign the first component to the first group of components, based at least in part on the workload assigned to the first component being classified to be relatively critical.

Clause 6. The apparatus of clause 4, wherein the first circuitry is to assign the first component to the first group of components, based at least in part on the workload assigned to the first component being classified to be relatively computationally intensive.

Clause 7. The apparatus of any of clauses 1-3, wherein the first circuitry is to assign the first component to the first group of components, based at least in part on comparing a first frequency of operation requested by the first component with a threshold frequency.

Clause 8. The apparatus of any of clauses 1-3, further comprising: a first plurality of components, wherein the first plurality of components includes the first component, wherein the first circuitry is to assign the first plurality of components to the first group of components, and wherein the first plurality of components is to operate in accordance with the first maximum frequency limit; and a second plurality of components, wherein the second plurality of components includes the second component, wherein the first circuitry is to assign the second plurality of components to the second group of components, and wherein the second plurality of components is to operate in accordance with the second maximum frequency limit.

Clause 9. The apparatus of any of clauses 1-3, wherein the first component is to operate at the first maximum frequency limit during a boost mode of operation.

Clause 10. A system comprising: a memory to store instructions; a first processing core coupled to the memory; a second processing core; one or more circuitries to: assign a first maximum frequency to the first processing core, and assign a second maximum frequency to the second processing core, the second maximum frequency being different from the first maximum frequency; and a wireless interface to allow one or both the first or second processing cores to communicate with another system.

Clause 11. The system of clause 10, wherein the one or more circuitries are to: allocate the first processing core to a first group of processing cores; and allocate the second processing core to a second group of processing cores.

Clause 12. The system of clause 11, wherein the one or more circuitries are to: assign the first maximum frequency to individual processing cores of the first group of processing cores; and assign the second maximum frequency to individual processing cores of the second group of processing cores.

Clause 13. The system of clause 10, wherein the one or more circuitries are to: assign the first maximum frequency to the first processing core and the second maximum frequency to the second processing core, based at least in part on the first processing core being assigned relatively critical workload compared to workload assigned to the second processing core, wherein the first maximum frequency is higher than the second maximum frequency.

Clause 14. The system of any of clauses 10-13, wherein the one or more circuitries are to: receive an identification of a first requested frequency from the first processing core and an identification of a second requested frequency from the second processing core, wherein the first requested frequency is higher than a cutoff frequency, and wherein the second requested frequency is lower than the cutoff frequency; and assign the first maximum frequency to the first processing core and the second maximum frequency to the second processing core, based at least in part on the first requested frequency being higher than the cutoff frequency and the second requested frequency being lower than the cutoff frequency, wherein the first maximum frequency is higher than the second maximum frequency.

Clause 15. The system of any of clauses 10-13, wherein: the first processing core is to operate in accordance with the first maximum frequency, such that an operating frequency of the first processing core does not exceed the first maximum frequency; and the second processing core is to operate in accordance with the second maximum frequency, such that an operating frequency of the second processing core does not exceed the second maximum frequency.

Clause 16. An apparatus comprising: a plurality of components; first one or more circuitries to perform one or both of: receive a plurality of parameters associated with workload assignment for the plurality of components, or receive a plurality of requested frequencies respectively for the plurality of components; and second one or more circuitries to assign respective maximum frequency limits to individual components of the plurality of components.

Clause 17. The apparatus of clause 16, wherein: the first one or more circuitries are to group the plurality of components into two or more groups; and the second one or more circuitries are to assign, to one or more components of a first group of the two or more groups, a first maximum frequency limit.

Clause 18. The apparatus of clause 17, wherein the one or more components of the first group is to operate in accordance with the first maximum frequency limit, such that operating frequencies of the one or more components of the first group does not exceed the first maximum frequency limit.

Clause 19. The apparatus of clause 17, wherein the second one or more circuitries are to select the first maximum frequency limit, based at least in part on a number of components in each group of the two or more groups.

Clause 20. The apparatus of clause 17, wherein the first one or more circuitries are to group the plurality of components into two or more groups, based at least in part on a criticality or priority of individual components of the plurality of components.

Clause 21. One or more non-transitory computer-readable storage media configured to store instructions that, when executed by a processor included in an apparatus, cause the processor to perform operations comprising: assign a first component to a first group of components and a second component to a second group of components; assign a first maximum frequency limit to the first group of components and a second maximum frequency limit to the second group of components; and cause to operate the first component and the second component, respectively, in accordance with the first maximum frequency limit and the second maximum frequency limit.

Clause 22. The one or more non-transitory computer-readable storage media of clause 21, wherein the first component is to operate in accordance with the first maximum frequency limit such that a frequency of operation of the first component does not exceed the first maximum frequency limit.

Clause 23. The one or more non-transitory computer-readable storage media of clause 21, wherein the first component and the second component are a first processing core and a second processing core, respectively.

Clause 24. The one or more non-transitory computer-readable storage media of any of clauses 21-23, wherein the first component is assigned to the first group of components, based at least in part on workload assigned to the first component.

Clause 25. The one or more non-transitory computer-readable storage media of any of clauses 21-23, wherein the first component is assigned to the first group of components, based at least in part on the workload assigned to the first component being classified to be relatively critical and/or relatively computationally intensive.

Clause 26. A method comprising: assigning a first component to a first group of components and a second component to a second group of components; assigning a first maximum frequency limit to the first group of components and a second maximum frequency limit to the second group of components; and causing to operate the first component and the second component, respectively, in accordance with the first maximum frequency limit and the second maximum frequency limit.

Clause 27. The method of clause 26, wherein the first component is to operate in accordance with the first maximum frequency limit such that a frequency of operation of the first component does not exceed the first maximum frequency limit.

Clause 28. The method of clause 26, wherein the first component and the second component are a first processing core and a second processing core, respectively.

Clause 29. The method of any of clauses 26-28, wherein the first component is assigned to the first group of components, based at least in part on workload assigned to the first component.

Clause 30. The method of any of clauses 26-28, wherein the first component is assigned to the first group of components, based at least in part on the workload assigned to the first component being classified to be relatively critical and/or relatively computationally intensive.

Clause 31. One or more non-transitory computer-readable storage media to store instructions that, when executed by a processor, cause the processor to execute a method of any of the clauses 26-30.

Clause 32. An apparatus comprising: means for performing the method of any of the clauses 26-30.

Clause 33. An apparatus comprising: means for assigning a first component to a first group of components and a second component to a second group of components; means for assigning a first maximum frequency limit to the first group of components and a second maximum frequency limit to the second group of components; and means for causing to operate the first component and the second component, respectively, in accordance with the first maximum frequency limit and the second maximum frequency limit.

Clause 34. The apparatus of clause 33, wherein the first component is to operate in accordance with the first maximum frequency limit such that a frequency of operation of the first component does not exceed the first maximum frequency limit.

Clause 35. The apparatus of clause 33, wherein the first component and the second component are a first processing core and a second processing core, respectively.

Clause 36. The apparatus of any of clauses 33-35, wherein the first component is assigned to the first group of components, based at least in part on workload assigned to the first component.

Clause 37. The apparatus of any of clauses 33-35, wherein the first component is assigned to the first group of components, based at least in part on the workload assigned to the first component being classified to be relatively critical and/or relatively computationally intensive.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   a first component and a second component;
   a first circuitry to assign the first component to a first group of components, and to assign the second component to a second group of components; and
   a second circuitry to assign a first maximum frequency limit to the first group of components, and to assign a second maximum frequency limit to the second group of components,
   wherein the first component and the second component are to respectively operate in accordance with the first maximum frequency limit and the second maximum frequency limit,
   wherein the first maximum frequency limit is higher than a baseline maximum frequency limit for the first and second components, and
   wherein the second maximum frequency limit is lower than the baseline maximum frequency limit for the first and second components, and
   wherein a number of components in the first and second groups is set dynamically,
   wherein the first circuitry is to assign the first component to the first group of components, based at least in part on a first workload with higher QoS than a second workload with lower QoS, which is assigned to the second component.

2. The apparatus of claim 1, wherein the first component is to operate in accordance with the first maximum frequency limit such that a frequency of operation of the first component does not exceed the first maximum frequency limit.

3. The apparatus of claim 1, wherein the first component and the second component are a first processor core and a second processor core, respectively.

4. The apparatus of claim 1, wherein the first circuitry is to assign the first component to the first group of components, based at least in part on workload assigned to the first component.

5. The apparatus of claim 4, wherein the first circuitry is to assign the first component to the first group of components, based at least in part on the workload assigned to the first component being classified to be relatively critical.

6. The apparatus of claim 4, wherein the first circuitry is to assign the first component to the first group of components, based at least in part on the workload assigned to the first component being classified to be relatively computationally intensive.

7. The apparatus of claim 1, wherein the first circuitry is to assign the first component to the first group of components, based at least in part on comparing a first frequency of operation requested by the first component with a threshold frequency.

8. The apparatus of claim 1, further comprising:
a first plurality of components, wherein the first plurality of components includes the first component, wherein the first circuitry is to assign the first plurality of components to the first group of components, and wherein the first plurality of components is to operate in accordance with the first maximum frequency limit; and
a second plurality of components, wherein the second plurality of components includes the second component, wherein the first circuitry is to assign the second plurality of components to the second group of components, and wherein the second plurality of components is to operate in accordance with the second maximum frequency limit.

9. The apparatus of claim 1, wherein the first component is to operate at the first maximum frequency limit during a boost mode operation.

10. A system comprising:
a memory to store instructions;
a first processor core coupled to the memory;
a second processor core;
one or more circuitries to:
assign a first maximum frequency limit to the first processor core, and
assign a second maximum frequency limit to the second processor core, the second maximum frequency being different from the first maximum frequency, wherein the first maximum frequency limit is higher than a baseline maximum frequency limit for the first and second processor cores, and wherein the second maximum frequency limit is lower than the baseline maximum frequency limit for the first and second processor cores;
wherein the baseline frequency limit is a function of a number of processor cores in a group, wherein the first processor core is in a first group of processor cores, wherein the second processor core is in a second group of processor cores, and wherein a number of processor cores in the first and second groups is set dynamically, wherein the one or more circuitries is to assign the first processor core to the first group of processor cores, based at least in part on a first workload with higher QoS than a second workload with lower QoS, which is assigned to the second processor core; and
a wireless interface to allow one or both the first or second processor cores to communicate with another system.

11. The system of claim 10, wherein the one or more circuitries are to:
allocate the first processor core to the first group of processor cores; and
allocate the second processor core to the second group of processor cores.

12. The system of claim 11, wherein the one or more circuitries are to:
assign the first maximum frequency to individual processing cores of the first group of processor cores; and
assign the second maximum frequency to individual processing cores of the second group of processor cores.

13. The system of claim 10, wherein the one or more circuitries are to:
assign the first maximum frequency to the first processor core and the second maximum frequency to the second processor core, based at least in part on the first processor core being assigned relatively critical workload compared to workload assigned to the second processor core,
wherein the first maximum frequency is higher than the second maximum frequency.

14. The system of claim 10, wherein the one or more circuitries are to:
receive an identification of a first requested frequency from the first processor core and an identification of a second requested frequency from the second processor core, wherein the first requested frequency is higher than a cutoff frequency, and wherein the second requested frequency is lower than the cutoff frequency; and
assign the first maximum frequency to the first processor core and the second maximum frequency to the second processor core, based at least in part on the first requested frequency being higher than the cutoff frequency and the second requested frequency being lower than the cutoff frequency,
wherein the first maximum frequency is higher than the second maximum frequency.

15. The system of claim 11, wherein:
the first processor core is to operate in accordance with the first maximum frequency, such that a clock frequency of the first processor core does not exceed the first maximum frequency; and
the second processor core is to operate in accordance with the second maximum frequency, such that a clock frequency of the second processor core does not exceed the second maximum frequency.

16. An apparatus comprising:
a plurality of components including first and second components;
first one or more circuitries to perform one or both of:
receive a plurality of parameters associated with workload assignment for the plurality of components, or
receive a plurality of requested frequencies respectively for the plurality of components; and
second one or more circuitries to assign respective maximum frequency limits to individual components of the plurality of components;
wherein:
the first one or more circuitries are to group the plurality of components into two or more groups;
the second one or more circuitries are to assign, to one or more components of a first group of the two or more groups, a first maximum frequency limit, and to assign one or more components of a second group of the two or more groups, a second maximum frequency limit;
the first maximum frequency limit is higher than a baseline maximum frequency limit for the one or more components, and
the second maximum frequency limit is lower than the baseline maximum frequency limit for the first and second components,
wherein a number of components in the first and second groups is set dynamically, wherein the second one or more circuitries is to assign the first component to the first group of components, based at least in part on a first workload with higher QoS than a second workload with lower QoS, which is assigned to the second component.

17. The apparatus of claim 16, wherein the one or more components of the first group is to operate in accordance with the first maximum frequency limit, such that clock frequencies of the one or more components of the first group do not exceed the first maximum frequency limit.

18. The apparatus of claim 16, wherein the second one or more circuitries are to select the first maximum frequency limit, based at least in part on a number of components in each group of the two or more groups.

19. The apparatus of claim 16, wherein the first one or more circuitries are to group the plurality of components into two or more groups, based at least in part on a criticality or priority of individual components of the plurality of components.

20. One or more non-transitory computer-readable storage media configured to store instructions that, when executed by a processor included in an apparatus, cause the processor to perform operations comprising:
   assign a first component to a first group of components and a second component to a second group of components;
   assign a first maximum frequency limit to the first group of components and a second maximum frequency limit to the second group of components; and
   cause to operate the first component and the second component, respectively, in accordance with the first maximum frequency limit and the second maximum frequency limit;
   wherein the first maximum frequency limit is higher than a baseline maximum frequency limit for the first and second components, and
   wherein the second maximum frequency limit is lower than the baseline maximum frequency limit for the first and second components,
   wherein a number of components in the first and second groups is set dynamically,
   wherein the first component is assigned to the first group of components, based at least in part on a first workload with higher QoS than a second workload with lower QoS, which is assigned to the second component.

21. The one or more non-transitory computer-readable storage media of claim 20, wherein the first component is to operate in accordance with the first maximum frequency limit such that a frequency of operation of the first component does not exceed the first maximum frequency limit.

22. The one or more non-transitory computer-readable storage media of claim 20, wherein the first component is assigned to the first group of components, based at least in part on workload assigned to the first component.

23. A multiprocessor system-on-chip (SOC) with a baseline frequency limit, the multiprocessor SOC comprising:
   a first processor core to operate at a first maximum frequency limit which is higher than the baseline frequency limit;
   a second processor core to operate at a second maximum frequency limit which is lower than the baseline frequency limit, wherein the first processor core has a higher workload compared to a workload of the second processor core; and
   a circuitry to dynamically and adaptively assign the first processor core the first maximum frequency limit and the second processor core the second maximum frequency limit;
   wherein the baseline frequency limit is a function of a number of processor cores in a group, wherein the first processor core is in a first group, and wherein the second processor core is in a second group; and
   wherein the number of processor cores in a group is set dynamically;
   wherein the circuitry is to assign the first processor core to the first group, based at least in part on a first workload with higher QoS than a second workload with lower QoS, which is assigned to the second processor core.

24. The SOC of claim 23, wherein the first processor core is assigned the first group, and the second processor core is assigned the second group based on a thermal limit.

25. The SOC of claim 23, wherein a number of groups, including the first group and the second group, is equal to a number of processor cores including the first and second processor cores.

26. The SOC of claim 23, wherein the first group is associated with a first virtual machine (VM), and wherein the second group is associated with a second VM.

* * * * *